(12) United States Patent
Jang et al.

(10) Patent No.: US 10,073,479 B2
(45) Date of Patent: *Sep. 11, 2018

(54) ELECTRIC DEVICE, POWER MANAGEMENT SYSTEM INCLUDING THE ELECTRIC DEVICE, AND METHOD FOR CONTROLLING THE SAME

(71) Applicant: SAMSUNG ELECTRONICS CO., LTD., Suwon-si, Gyeonggi-do (KR)

(72) Inventors: Jae Hwi Jang, Yongin-si (KR); Jong Hyun Shin, Suwon-si (KR); Hyun Soo Park, Seoul (KR); Young Jin Park, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,643

(22) Filed: Jan. 22, 2015

(65) Prior Publication Data

US 2015/0134140 A1 May 14, 2015

Related U.S. Application Data

(63) Continuation of application No. 13/137,027, filed on Jul. 15, 2011, now Pat. No. 8,954,200.

(30) Foreign Application Priority Data

Sep. 29, 2010 (KR) .................. 10-2010-0094136

(51) Int. Cl.
  *G05F 1/66* (2006.01)
  *G05B 15/02* (2006.01)
  *H02J 3/14* (2006.01)

(52) U.S. Cl.
  CPC .............. *G05F 1/66* (2013.01); *G05B 15/02* (2013.01); *H02J 3/14* (2013.01);
  (Continued)

(58) Field of Classification Search
  CPC .............. G05F 1/66; G05B 15/02; H02J 3/14
  (Continued)

(56) References Cited

U.S. PATENT DOCUMENTS 5,812,422 A * 9/1998 Lyons ............................ 703/18
2003/0225483 A1* 12/2003 Santinato et al. ............ 700/295
(Continued)

FOREIGN PATENT DOCUMENTS

| EP | 1 367 685 | 5/2002 |
| EP | 2 354 890 | 1/2011 |
| KR | 10-2010-0005406 | 1/2010 |

OTHER PUBLICATIONS

European Search Report dated Sep. 9, 2013 in corresponding European Application No. 11 17 4949.
(Continued)

*Primary Examiner* — Kenneth M Lo
*Assistant Examiner* — Sivalingam Sivanesan
(74) *Attorney, Agent, or Firm* — Staas & Halsey LLP

(57) ABSTRACT

A power management apparatus includes an electric device including a plurality of operation algorithm information and power information for each operation level corresponding to each operation algorithm information, and a power management unit to receive power rate information from a power provider, determine an operation level of the electric device on the basis of the received power rate information and power information for each operation level of the electric device, and control an operation of the electric device at the determined operation level. As a result, the power management apparatus performs different operation algorithms according to power rate information, and controls power consumption of the electric device, such that energy efficiency at the user side can be maximized. In response to the changed power rate information, the currently-driven electric device and the electric device to be driven can be driven at the optimum operation level appropriate for their power consumption characteristics.

24 Claims, 14 Drawing Sheets

(52) U.S. Cl.
CPC ... *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC .......................................................... 700/295
See application file for complete search history.

(56) References Cited

U.S. PATENT DOCUMENTS

| 2010/0070099 | A1* | 3/2010 | Watson et al. | 700/295 |
| 2010/0070101 | A1* | 3/2010 | Benes et al. | 700/296 |
| 2010/0088261 | A1* | 4/2010 | Montalvo | 706/15 |
| 2010/0092625 | A1* | 4/2010 | Finch et al. | 426/231 |

OTHER PUBLICATIONS

U.S. Office Action dated Mar. 11, 2014 in copending U.S. Appl. No. 13/137,027.
U.S. Notice of Allowance dated Oct. 8, 2014 in copending U.S. Appl. No. 13/137,027.
U.S. Appl. No. 13/137,027, filed Jul. 15, 2011, Jae Hwi Jang, Samsung Electronics Co., Ltd.
Korean Office Action dated Dec. 6, 2016 from Korean Patent Application No. 10-2010-0094136, 17 pages.
Korean Notice of Allowance dated Feb. 13, 2017 from Korean Patent Application No. 10-2010-0094136, 7 pages.
European Office Action dated Jul. 12, 2016 from European Patent Application No. 11174949.5, 6 pages.
European Patent Office Rule 71(3) Intention to Grant Communication dated Aug. 30, 2017 in related European Application No. 11 174 949.

* cited by examiner

FIG. 3

| FIRST GROUP (G1) | SECOND GROUP (G2) | THIRD GROUP (G3) |
|---|---|---|
| WASHING MACHINE, DRYER, DISH WASHER | AIR-CONDITIONER, TELEVISION, REFRIGERATOR, KIMCHI REFRIGERATOR, LAMP | ELECTRIC OVEN, STOVE, PRINTER |

FIG. 4A

| OPERATION LEVEL | MAXIMUM INSTANTANEOUS POWER (KW) | AVERAGE POWER CONSUMPTION (KW) | OPERATION TIME(MIN)(POWER CONSUMPTION TIME) | OPERATION ALGORITHM |
|---|---|---|---|---|
| L0(STANDBY LEVEL) | 0.019 | 0.019 | 0 | STANDBY STATE |
| L1 | 1.5 | 1.13 | 200 | Full Wash/Rinse FUNCTION<br>Full Spin Dry FUNCTION<br>Full Heat Dry FUNCTION |
| L2 | 0.23 | 0.14 | 120 | Full Wash/Rinse FUNCTION<br>Full Spin Dry FUNCTION |
| L3 | 0.21 | 0.11 | 80 | Full Wash/Rinse FUNCTION<br>Simple Spin Dry FUNCTION |

FIG. 4B

| OPERATION LEVEL | MAXIMUM INSTANTANEOUS POWER (KW) | AVERAGE POWER CONSUMPTION (KW) | OPERATION TIME(MIN)(POWER CONSUMPTION TIME) | OPERATION ALGORITHM |
|---|---|---|---|---|
| L0(STANDBY LEVEL) | 0.02 | 0.02 | 0 | STANDBY STATE |
| L1 | 3.4 | 3.23 | NA | INDOOR UNIT K1 FILTER NORMAL OPERATION<br>INDOOR-UNIT SPI UNIT NORMAL OPERATION<br>OUTDOOR UNIT FREQUENCY 100% OPERATION (85HZ) |
| L2 | 3.01 | 2.86 | NA | INDOOR UNIT K1 FILTER NORMAL OPERATION<br>INDOOR UNIT SPI UNIT NORMAL OPERATION<br>OUTDOOR UNIT FREQUENCY 84% OPERATION (75HZ) |
| L3 | 2.5 | 2.23 | NA | INDOOR UNIT STOPS OPERATION<br>60% OPERATION (55HZ) OF OUTDOOR UNIT FREQUENCY |
| L4 | 1.4 | 1.21 | NA | INDOOR UNIT STOPS OPERATION<br>OPERATION (30HZ) OF OUTDOOR UNIT FREQUENCY |

ELECTRIC DEVICE, POWER MANAGEMENT SYSTEM INCLUDING THE ELECTRIC DEVICE, AND METHOD FOR CONTROLLING THE SAME

CROSS-REFERENCE TO RELATED APPLICATIONS

This application is a continuation of U.S. application Ser. No. 13/137,027, filed on Jul. 15, 2011, which claims the benefit of Korean Patent Application No. 10-2010-0094136, filed on Sep. 29, 2010 in the Korean Intellectual Property Office, the disclosures of which are incorporated herein by reference.

BACKGROUND

1. Field

Embodiments relate to an electric device for balancing power supply and demand by adjusting power consumption, a power management system including the electric device, and a method for controlling the same.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. During periods of peak load, electricity costs the most to generate and deliver, and therefore power providers raise the power rate charged to consumers during periods of peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By means of the DR, a power-supply source can alter end user power consumption to achieve load balancing and can restrict end user power consumption to periods when demand is low, thereby reducing the user's overall energy expenditure.

Therefore, an electric device to which demand response (DR) is applied has been developed. The electric device receives real-time power rate information from the power-supply source or the power provider, and is turned on or off in response to the received power rate information.

Since the electric device is turned on or off according to the power rates, the electric device is unable to effectively perform functions desired by the user.

SUMMARY

Therefore, it is an aspect to provide an electric device which decides an operation level on the basis of power rate levels and is controlled by an operation algorithm corresponding to the decided operation level, a power management system including the electric device, and a method for controlling the same.

It is another aspect to provide an electric device which decides an operation level in response to a discomfort degree of a user or consumer and is controlled by an operation algorithm in response to the decided operation level, a power management system including the electric device, and a method for controlling the same.

It is another aspect to provide an electric device which decides an operation level using an operation level decision process for each group and is controlled by an operation algorithm corresponding to the decided operation level, a power management system including the electric device, and a method for controlling the same.

It is another aspect to provide an electric device which additionally generates a user-desired operation algorithm, a power management system including the electric device, and a method for controlling the same.

Additional aspects will be set forth in part in the description which follows and, in part, will be apparent from the description, or may be learned by practice of the invention.

In accordance with one aspect, a power management system includes an electric device including a plurality of operation algorithm information and power information for each operation level corresponding to each piece of operation algorithm information; and a power management unit to receive power rate information from a power provider, determine an operation level of the electric device on the basis of the received power rate information and power information for each operation level of the electric device, and control an operation of the electric device at the determined operation level.

The power information includes maximum power consumption, average power consumption, and an operation time during which power is consumed.

The power management unit determines a group of the electric device on the basis of an operation time of the electric device, and determines the operation level on the basis of the group of the electric device.

The group includes a first group in which it is possible to establish an operation time of the electric device, a second group in which it is impossible to establish the operation time of the electric device, and a third group in which it is impossible to establish the operation time and the operation level of the electric device.

The power management unit reflects the power rate for each operation level and a discomfort degree for each operation level into the deciding of the operation level of the electric device.

If the electric device is in the first group, the power management unit reflects the power rate information, average power consumption for each operation level, an operation time for each operation level, and a discomfort degree for each operation level, thereby deciding the operation level.

If the electric device is in the first group, the power management unit controls the electric device at an operation level decided when the electric device begins to operate, until reaching an operation end time.

If the electric device is in the first group, the power management unit confirms a variation in power rate information within a predetermined time, and if the power rate is changed in a low level, the power management unit informs a user of a standby time consumed until the power rate information begins to change.

If the electric device is in the second group, the power management unit calculates an average operation time of the electric device, reflects the calculated average operation time, average power consumption, power rate information, a discomfort degree for each operation level, and thus determines an operation level.

If the electric device is in the second group, the power management unit calculates an average operation time of the electric device, reflects the calculated average operation time, the number of variation times of power rate information contained in the average operation time, average power consumption, and a discomfort degree for each operation level, and thus determines an operation level.

If the electric device is in the second group, the power management unit reflects an operation time from an operation start time point of the electric device to a specific time where the power rate information is changed, power rate information, and a discomfort degree for each operation level, and thus determines the operation level.

If the electric device is in the second group, the power management apparatus controls the electric device at an operation level decided at the operation start time point of the electric device, and re-decides the operation level at the specific time where the power rate information is changed.

The power management unit includes a display to display the re-decided operation level, and a sound unit to audibly output the re-decided operation level.

If the electric device is in the third group, the power management unit informs a user of a time having a minimum power rate for each power rate information.

The operation level includes a standby level at which power information is established when the electric device stays in a standby state.

If the decided operation level exceeds predetermined allowed instantaneous power or a monthly predetermined power rate, the power management unit is controlled in the standby level.

The power management unit includes a display to display a specific time where the power rate information is changed, a changed power rate level, and an operation level assigned to the changed power rate level, when the electric device is controlled in the standby level; and a sound unit to audibly output the specific time where the power rate information is changed, a changed power rate level, and an operation level assigned to the changed power rate level.

If several electric devices are present and the several electric devices are simultaneously driven, the power management unit decides an operation level according to priority information of the several electric devices.

The electric device includes a display to display at least one of the decided operation level, an operation time for each operation level, and a power rate for each operation level; and a sound unit to audibly output at least one of the decided operation level, an operation time for each operation level, and an expected power rate for each operation level.

The electric device includes an input unit to receive an operation level addition signal as an input, and further receive a function constructing the operation algorithm as an input; and a controller to additionally establish an operation level corresponding to the added function, and transmit power information of the established operation level to the power management unit.

In accordance with another aspect, a method for controlling a power management system includes receiving power information for each operation level from an electric device; determining a group of the electric device; storing the determined group information and power information for each operation level; receiving power rate information from a power provider; determining an operation level of the electric device on the basis of power information and power rate information for each operation level; and controlling the electric device using an operation algorithm corresponding to the determined operation level.

The determining of the group includes, if the operation time of the electric device is established, determining the electric device to be a first group; if the operation time of the electric device is not established, determining the electric device to be a second group; and if an operation level and an operation time of the electric device are not established, determining the electric device to be a third group.

The determining of the operation level of the electric device further includes reflecting a discomfort degree for each operation level.

The determining of the operation level of the electric device includes, if the electric device is in the first group, calculating a power rate for each operation level; reflecting a discomfort degree for each operation level to the power rate for each operation level so as to calculate each level value; and determining a specific level having a minimum level value to be the operation level.

The method may further include, if the electric device is in the second group, controlling the electric device in the range from an operation start time point of the electric device to an operation end time point of electric device at an operation level determined at the operation start time point.

The method may further include, if the electric device is in the second group, determining whether power rate information is changed within a predetermined time; and if the power rate is changed in a low level, informing a user of a standby time consumed until the power rate information begins to change.

The determining of the operation level of the electric device may include calculating an average operation time of the electric device if the electric device is in the second group; calculating a power rate for each operation level on the basis of the average operation time, the power rate information, and average power consumption for each operation level; calculating each level value by reflecting a discomfort degree for each operation level into the power rate for each operation level; and determining a specific level having a minimum level value to be an operation level.

The determining of the operation level of the electric device may include calculating an average operation time of the electric device if the electric device is in the second group; determining the number of variation times of the power rate information during the average operation time; generating a combination of operation levels corresponding to the number of variation times of the power rate information; calculating a power rate for each operation level combination; reflecting a discomfort degree for each operation level in a power rate for each operation level combination so as to calculate each level value; and determining a specific level having a minimum level value to be an operation level.

The determining of the operation level of the electric device may include calculating a power rate for each operation level during a predetermined time from an operation start time of the electric device to an operation end time of the electric device; reflecting a discomfort degree for each operation level in a power rate for operation level so as to calculate each level value; and determining a specific level having a minimum level value to be an operation level.

The determining of the operation level of the electric device may include controlling the electric device in an operation level decided at an operation start time of the electric device, if the electric device is in the second group; and re-determining the operation level at a time where the power rate information begins to change.

The method may further include informing a user of the re-determined operation level.

The method may further include, if the electric device is contained in a third group, informing a user of a predetermined time having a minimum power rate for each power rate information.

The system may further include, if the decided operation level exceeds predetermined allowed instantaneous power or a monthly predetermined maximum power rate, controlling the electric device to enter a standby level where the electric device is maintained in a standby state.

The system may further include, if several electric devices are present, controlling the several electric devices to enter the standby level in ascending numerical order of priority information.

The priority information of the several electric devices may be entered and established by a user.

The system may further include, when the electric device is controlled in a standby level, indicating a time where the power rate information is changed, the changed power rate information, and an operation level assigned to the changed power rate information.

The system may further include informing a user of at least one of the determined operation level, an operation time for each operation level, and a power rate for each operation level.

The system may further include, if an additional operation level of the electric device is established, receiving at least one function constructing an operation algorithm; generating power information corresponding to the selected function, and establishing/storing an operation level; and transmitting the additionally-established operation level to a power management unit, wherein the power management unit updates an operation level of the electric device.

The system may further include, if an operation level is entered by a user, controlling an operation of the electric device using an operation algorithm corresponding to the entered operation level.

The method may further include determining a power rate level on the basis of the received power rate information.

In accordance with another aspect, an electric device includes a communication unit to receive power rate information from a power provider; a storage unit to store a plurality of operation algorithm information and power information for each operation level corresponding to each of the operation algorithms; and a controller to determine an operation level of the electric device on the basis of the power rate information and power information for each operation level of the electric device, and control an operation of the electric device using an operation algorithm corresponding to the determined operation level.

The controller may reflect a discomfort degree in the determining of the operation level.

The electric device may further include an input unit to receive an operation level from a user and receive an additional operation level as an input.

The power information may include average power consumption and operation time information, and the controller, when determining the operation level, receives information indicating whether the operation time is established and performs an operation level decision process corresponding to the information indicating whether the operation level is established.

In accordance with another aspect, a method for controlling an electric device includes receiving power rate information from a power provider; determining an operation level on the basis of the power rate information and power information for each pre-stored operation level; and controlling an operation of the electric device using an operation algorithm corresponding to the determined operation level.

The determining of the operation level may include determining whether an operation time is established in the power information; if the operation time is established in the power information, calculating a power rate for each operation level; reflecting a discomfort degree for each operation level to the power rate for each operation level, and calculating each level value; and determining an operation level having a minimum level value to be an operation level.

The determining of the operation level may include determining whether the operation time is established in the power information; calculating an average operation time, if the operation time is not established in the power information; calculating a power rate for each operation level on the basis of the average operation time, the power rate information, and average power consumption for each operation level; reflecting a discomfort degree for each operation level into the power rate for each operation level so as to calculate each level value; and determining an operation level having a minimum level value to be an operation level.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 exemplarily shows the list of groups of electric devices contained in a power management system according to an embodiment.

FIGS. 4A and 4B exemplarily show not only power information for each operation level of an electric device contained in a power management system but also operation algorithm information according to one embodiment.

DETAILED DESCRIPTION

Figure 1:
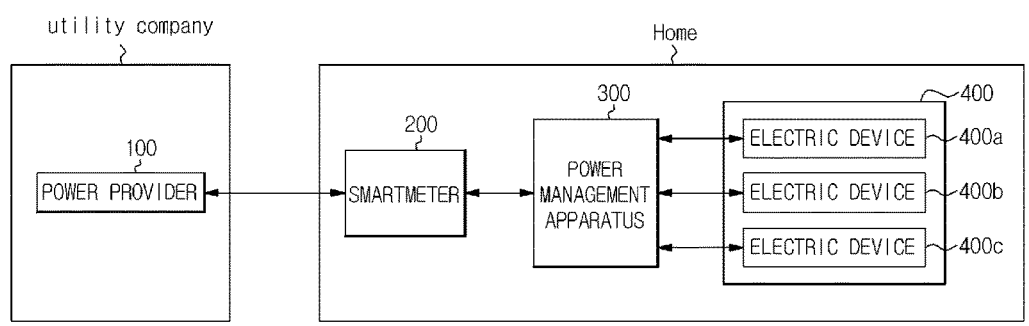
FIG. 1 is a configuration diagram illustrating a power management system according to an embodiment.

Reference will now be made in detail to the embodiments, examples of which are illustrated in the accompanying drawings, wherein like reference numerals refer to like elements throughout.

Figure 2:
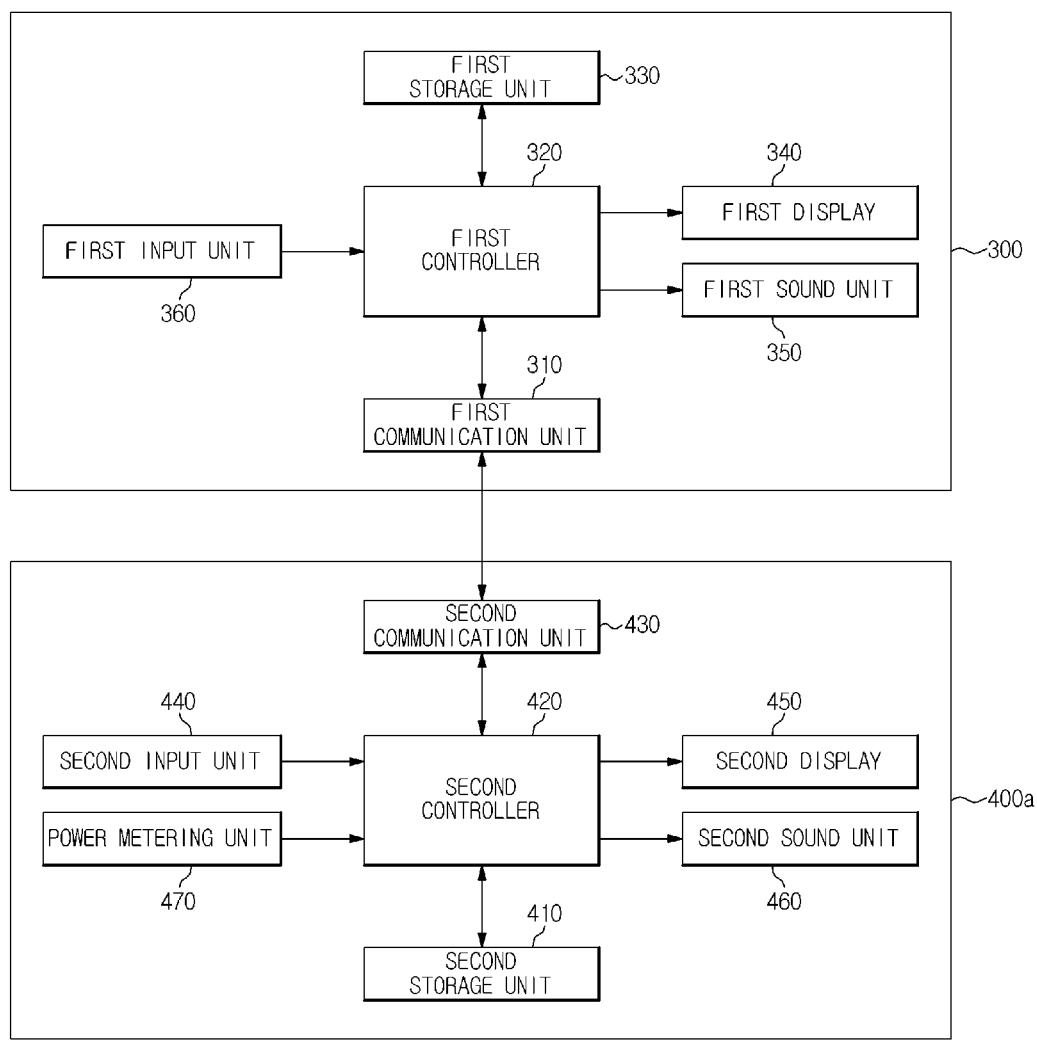
FIG. 2 is a detailed block diagram illustrating a power management apparatus contained in a power management system and an electric device according to an embodiment.

FIG. 1 is a configuration diagram illustrating a power management system according to an embodiment. FIG. 2 is a detailed block diagram illustrating a power management apparatus contained in a power management system and an electric device according to an embodiment.

Referring to FIG. 1, a power management system includes a power provider 100, a smartmeter 200, a power management apparatus 300, and an electric device 400.

The power provider 100 is a power supply source that is operated by a power supply company (utility company) which generates and supplies power. The power provider 100 generates the power through atomic energy, hydroelectric power, geothermal power, wind power, etc., and provides the generated power to electric devices 400 installed in homes.

In this case, in relation to the power provided to the electric devices installed in homes, a predetermined amount of power is generated each hour such that the generated amount of power is provided to each home. In contrast, different amounts of power are consumed in each home according to individual periods. For example, power consumption of each home during a dawn or morning period is less than that during another period such as the afternoon or dusk. In addition, power consumption of each home in spring or autumn is less than that in summer or winter.

Therefore, the power provider 100 determines the power rate of a period of low power consumption to be less than that of a high power consumption period, determines the power rate of a season of low power consumption to be less than a high power consumption season, and provides power of the determined power rate to each home.

The power provider 100 controls power rates of each home to be elastically adjusted in response to power consumption of each home, and provides the adjusted power to each home, such that demand can be balanced.

That is, the power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to decide power bills. If the calculated monthly power rates are higher than the monthly predetermined power rates, information about the excess of the monthly predetermined power rates is transmitted to the power management apparatus 300 installed in the corresponding home, such that an event indicating the excess of monthly predetermined power rates is generated through the power management apparatus 300 installed in each home.

The power provider 100 stores a threshold power amount for each home, compares power consumption amount for each home with a threshold power amount, and thus decides a power limit.

In this way, the power provider 100 manages the power demand of each home on the basis of the threshold power amount or the monthly predetermined power rates.

In this case, the threshold power amount for limiting the power supply of each home may be arbitrarily determined by the power supply company, or may be determined by agreement with the power supply company for each home. In addition, the monthly predetermined power rates of each home are determined by agreement with the power supply company.

The power provider 100 stores and manages information about the excess of a threshold power amount for each consumer, power consumption state information about the excess of the monthly predetermined power rates, and the like.

The power provider 100 is connected to the smartmeter 200 installed in each home, the power management apparatus 300, and each electric device 400 over a network, such that information regarding power demand management can be transmitted and received over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the power management apparatus 300.

The smartmeter 200 receives power rate information from the power provider 100, displays the received power rate information, and transmits the power rate information to the power management apparatus 300. In addition, the smart meter 200 may further display a power rate level corresponding to the power rate information upon receiving the power rate information from the power provider 100.

The power management apparatus (i.e., Energy Management System: EMS) 300 may also be referred to as a Demand Response (DR) controller. The power management apparatus 300 communicates with the smartmeter 200, and thus receives a power rate and a power rate level corresponding to the power rate from the smartmeter 200. In addition, the power management apparatus 300 communicates with the electric device 400 to receive information of the electric device 400, and controls the operation of the electric device 400 on the basis of the power rate level of the power provider 100 and power information of the electric device 400.

The power management apparatus 300 may also establish a power rate level on the basis of power rates upon receiving only the power rates from the power provider 100.

In this case, the power management apparatus 300 receives power rate information of the power provider 100 through the smartmeter 200 at intervals of a unit time, and establishes a power rate level for each power rate information using the received power rate information for each unit time.

In this case, the number of the power rate levels may be 4 (DR1 to DR4), and a plurality of levels may have different power rates and different allowed instantaneous powers. Let us assume that the number of power rate levels is 4 (DR1 to DR4). In more detail, the power rate level DR1 is the lowest power rate level, and the power rate level DR4 is the highest power rate level. Power rate level is proportional to power rate.

The power management apparatus 300 receives information about excess threshold power and information about excess monthly predetermined power rates from the power provider 100, and informs the user of the received information.

When the power management apparatus 300 compares the predicted (or current) instantaneous power amount with the allowed instantaneous power amount, if the predicted (or current) instantaneous power amount is equal to or greater than the allowed instantaneous power amount, driving of several electric devices 400 is controlled according to predetermined priority information, and the controlled result is output so as to inform the user of the controlled result.

Referring to FIG. 2, the power management apparatus 300 includes a first communication unit 310, a first controller 320, a first storage unit 330, a first display 340, a first sound unit 350, and a first input unit 360.

The first communication unit 310 communicates with the smartmeter 200, receives the power rates and the power rate level information corresponding to the power rates from the smartmeter 200, and transmits the received power rates and the received power rate level information to the first controller 320. The first communication unit 310 communicates with the electric device 400, receives information of the electric device 400 from the electric device 400, transmits the received information to the first controller 320, receives a driving control signal of the electric device 400 from the first controller 320, and transmits the received signal to the electric device 400.

In this case, the information of the electric device 400 includes electric device name information, power information, and the like. If the electric device 400 is in the first group G1 or the second group G2, the power information may include maximum instantaneous power, average power consumption, and operation time information related to power consumption.

The electric device of the third group G3 is unable to establish an operation level. The power information of the electric device of the third group G3 includes maximum instantaneous power and average power consumption information.

The first communication unit 310 transmits variety user information stored in the first storage unit 330 to the power provider 100, such that the power provider 100 can determine which home corresponds to information about power consumption for each time period.

The first controller 320 decides a group including each electric device on the basis of power information for each operation level of the electric device 400 (400a, 400b, 400c), and stores information about the decided group in the first storage unit 330.

When deciding a group including each electric device, the first controller 320 determines whether an operation time is assigned to power information for each operation level. If the operation time is assigned to the power information for each operation level, the first group G1 is decided. Otherwise, if the operation time is not assigned thereto, the first controller 320 determines whether an operation level can be established or not. In this case, if it is possible to establish the operation level, the second group G2 is decided. Otherwise, if it is impossible to establish the operation level, the third group G3 is decided.

Referring to FIG. 3, the first group G1 includes a plurality of electric devices (e.g., a washing machine, a dish washer, and a dryer) from among several electric devices. In the case of the electric devices contained in the first group G1, it is possible to establish an operation time for each operation level. Electric devices contained in the second group G2 include an air-conditioner, a television, a vacuum cleaner, a lamp, etc. The electric devices of the second group G2 vary their operation times according to the demand of a consumer. Such electric devices are always driven in the same manner as in a refrigerator or a kimchi refrigerator and the operation algorithms of the electric devices are changed in response to consumer demand, such that it is impossible to predict a specific time where the operation condition of the electric device is changed. In other words, it is impossible for the above-mentioned electric device to establish or predict a current operation algorithm maintenance time.

The first group G1 or the second group G2 includes a standby level where the standby state is maintained without the execution of functions of the electric devices. In the case of the second group G2, an operation time for each operation level is set to "NA".

In this case, the operation level is established on the basis of at least one of average power consumption and an operation time, and the average power consumption and the operation time are decided according to an operation algorithm.

The third group G3 includes a cooktop or electric oven, an operation algorithm of which must be changed according to the user's intention, and further includes a printer, an output paper quality of which is greatly deteriorated when an operation algorithm is changed. In more detail, when the operation algorithm is automatically changed, the output paper quality is deteriorated, such that the printer is unable to establish an operation level. In the case of each electric device of the third group, an operation level of the electric device is not established because it is impossible to establish an operation level of the electric device, and the electric device includes only maximum instantaneous power and average power consumption information.

The first controller 320 receives a drive signal of at least one electric device 400 (400a, 400b, or 400c), confirms the group of the corresponding electric device using the list of groups stored in the first storage unit 330, confirms a power rate level, and performs an operation level decision process of the corresponding group on the basis of the power rate level and the power information of the electric device 400, such that it decides an operation level of the electric device 400.

In more detail, if an electric device to be driven belongs to the first group, the first controller 320 calculates power rate for each operation level. A discomfort degree for each operation level is reflected in the calculated power rate for each operation level, such that each level value is calculated. A specific level corresponding to a minimum level value is set to an operation level, and the driving of the electric device is controlled until reaching an operation end time at an operation level decided at the operation start time of the electric device.

In this case, the term "discomfort degree" indicates a user's degree of discomfort in response to an operation level, and a predetermined value is assigned to each operation level. For example, the operation level "L1" is assigned to the discomfort degree "0", the operation level "L2" is assigned to the discomfort degree "10", the operation level "L3" is assigned to the discomfort degree "20", and the operation level "L4" is assigned to the discomfort degree "30".

In addition, the discomfort degree is preset to a percentage of each operation level according to a total number of operation levels.

For example, provided that the total number of operation levels to the exclusion of the standby level (L0) is 3, the operation level "L1" is assigned the discomfort degree "(0/3)*100%", the operation level "L2" is assigned the discomfort degree "(1/3)*100%", the operation level "L3" is assigned the discomfort degree "(2/3)*100%", and the operation level "L0" is assigned the discomfort degree "(3/3)*100%".

For example, provided that the total number of operation levels to the exclusion of the standby level (L0) is 4, the operation level "L1" is assigned the discomfort degree "(0/4)*100%", the operation level "L2" is assigned the discomfort degree "(1/4)*100%", the operation level "L3" is assigned the discomfort degree "(2/4)*100%", the operation level "L4" is assigned the discomfort degree "(3/4)*100%", and the operation level "L0" is assigned the discomfort degree "(4/4)*100%".

In addition, the discomfort degree may be established according to the increasing operation time for each operation level, or may be established according to the power rates varying with an operation time for each operation level.

If the electric device 400 to be driven is in the first group or the second group, the first controller 320 determines variation in power rate level within a predetermined time. If a power rate level to be changed is lower than a current power rate level, the first controller 320 determines a standby time until a variation start time of a power rate level is reached, and controls the first display 340 and the first sound unit 350, so that it indicates a standby time.

If the electric device 400 to be driven is contained in a second group, the first controller 320 decides an operation level using the following first to third operation level decision processes.

The first operation level decision process calculates an average operation time of the electric device 400, assumes that the electric device 400 is operated during the average operation time, calculates the power rates (electricity bill) for each operation level, reflects a discomfort degree for each operation level in the power rate for each operation level so as to calculate each level value. The first operation level decision process decides a specific level having a minimum level value to be an operation level, and controls the driving of the electric device until an operation end time at an operation level decided at the operation start time of the electric device is reached.

The second operation level decision process calculates an average operation time of the electric device 400, combines individual operation levels on the basis of the number of power rate level variations encountered during the average operation time, calculates the power rate for each combination on the basis of each power rate level, reflects a discomfort degree for each operation level so as to calculate each level value, and decides a specific level having a minimum level value to be an operation level. In other words, provided that N operation levels are established, if the power rate level is changed three times, $N^3$ combinations are generated.

The third operation level decision process calculates the power rate level for each operation level in the range from an operation start time of the electric device to a specific time where the power rate level is changed to another. The third operation level decision process reflects a discomfort degree for each operation level in the power rate for each operation level so as to calculate each level value. In addition, a specific level having a minimum level value is determined to be an operation level, so that the third operation level decision process controls the driving of the electric device 400 at an operation level decided at the operation start time of the electric device. The third operation level decision process re-decides an operation level whenever the power rate level is changed, indicates the re-decision of the operation level by controlling the first display 340 and the first sound unit 350, and controls the driving of the electric device 400 at the re-decided operation level in the range from a power rate level change start time.

As described above, the variation in power rate in response to the changed operation level and the user's discomfort are simultaneously considered, such that the optimum operation level can be decided.

If the electric device to be driven is in the third group, the first controller 320 decides a specific time having a minimum power rate for each power rate level, and indicates the decided time as a recommended operation time by controlling the first display 340 and the first sound unit 350.

If the decided operation level exceeds the predetermined allowed instantaneous power or the monthly predetermined maximum power rate, the first controller 320 controls the electric device to be maintained at the standby level (L0).

The first controller 320 decides a change time of a power rate level, a changed power rate level, and an operation level of the changed power rate level, and informs the decided result through the first display 340 and the first sound unit 350. In addition, the first controller 320 calculates the power rate for each operation level at the power rate level to be changed, and indicates the calculated power rate for each operation level and associated operation time through the first display 340 and the first sound unit 350.

Provided that a plurality of electric devices 400 is present, if the driving of the electric devices (400: 400a, 400b, 400c) is commanded and the operation levels of the electric devices (400: 400a, 400b, 400c) are decided according to the priority, and if the predicted instantaneous power to be generated when the several electric devices are driven exceeds the allowed instantaneous power, the electric devices arranged in ascending numerical order are controlled to have a standby level (L0).

In addition, the first controller 320 decides the operation level of the electric device to be driven to be the lowest operation level. In this case, if the predicted instantaneous power to be generated exceeds the allowed instantaneous power, the electric devices arranged in ascending numerical order may also be controlled to sequentially enter the standby level (L0) as necessary.

In this case, the priorities of the electric devices (400: 400a, 400b, 400c) may be pre-established and stored, or may be entered by a consumer or user and then stored or changed.

The first controller 320 sums the maximum instantaneous power of the electric devices to be driven on the basis of information stored in the first storage unit 330 so that it predicts the instantaneous power according to the sum of maximum instantaneous power. The first controller 320 compares the predicted instantaneous power with the allowed instantaneous power. If the predicted instantaneous power is equal to or higher than the allowed instantaneous power, the operations of the electric devices arranged in ascending numerical priority order are controlled to be sequentially delayed. Otherwise, if the predicted instantaneous power is less than the allowed instantaneous power, individual electric devices are controlled to be normally driven according to the decided operation level.

If the power rate corresponding to current power consumption approaches the monthly predetermined power rate or if the current power rate exceeds the monthly predetermined power rate, the first controller 320 controls the first display 340 and the first sound unit 350 and informs the consumer of the controlled result.

In this way, differential operation algorithms of individual operation levels are properly controlled according to the power rate level, such that the electric devices 40 can be effectively driven, resulting in reduction in power consumption.

If the current instantaneous power exceeds the allowed instantaneous power of each electric device (400: 400a, 400b, 400c), the first storage unit 330 stores the priority to be controlled in a standby level, stores the group of each electric device, and also stores power information (e.g., maximum instantaneous power, average power consumption, and operation time) of each electric device.

The first storage unit 300 stores a discomfort degree for each operation level, and also stores consumer information. In this case, the consumer information may include the monthly predetermined power rate, the allowed instantaneous power information, and the consumer's personal information.

The first display 340 displays the power rate level of a current time or the power rate level for each time period of the previous day, displays the current power rate, and displays an operation level of the electric device to be driven. If the electric device is driven at the displayed operation level, the first display 340 displays the power rate. Then, when the electric device is driven, the first display 340 displays the operation state of the driven electric device.

In addition, the first display 340 may further display operation times and power rate for each operation level of an electric device to be driven.

If a current power rate level is changed, the first display 340 displays the changed power rate level as a text message, and also displays a time consumed until the current power rate level is changed to another power rate level as a text message.

The first display 340 may display the allowed instantaneous power, and may also display the power rates assessed until the current time.

If the operation level of the electric device is changed to another by a user or consumer, the first display 340 displays the changed operation level and associated power rates.

If the electric device to be driven is in the third group G3, the first display 340 displays a recommended operation time of the corresponding electric device having the effective power saving effect.

The first sound unit 350 outputs the next power rate level as a voice signal, and also outputs a time consumed until the next power rate level as a voice signal.

The first sound unit 350 audibly outputs the operation level of the electric device to be driven and the power rates corresponding to the operation level, such that the user or consumer can easily recognize the output operation level and the power rates.

In addition, the first sound unit 350 may also audibly output the operation time and the power rate for each operation level of the electric device to be driven.

When the current operation level of the electric device is changed by the user or consumer, the first sound unit audibly outputs the changed operation level and the power rates corresponding to the changed operation level, such that the consumer can easily recognize the changed operation level and the power rates.

The first sound unit 350 audibly outputs information about the excess of the allowed instantaneous power and information about the excess of the monthly predetermined power rates.

The first input unit 360 receives information regarding the consumer, transmits the received information to the first controller 230, receives priority information of several electric devices, and transmits the received priority information to the first controller 320. If the operation level of the electric device to be driven is selected by a consumer or user, the selected operation level is transmitted to the first controller 320.

The first input unit 360 may be integrated with the first display 340, thereby forming a touchscreen.

As described above, the power management system classifies several different operation levels in order for the user to select the power consumption or the operation time, such that it can decide an operation level suitable for the variation in the power rate level, thereby effectively utilizing power according to the power rate levels.

The electric device 400 transmits predetermined information to the power management apparatus 300. In this case, the predetermined information includes device name information and power information. In other words, the electric device 400 transmits power information for each operation level to the power management apparatus 300. If the consumer or user commands the electric device to be driven or a current time reaches a reserved time, the operation algorithm is executed at an operation level decided by the power management apparatus 300 and thus the corresponding electric device is driven.

In this case, the power information for each operation level may be predetermined by a manufacturer of the electric device, or may also be established by the consumer or user.

In addition, if the user or consumer does not want to drive the electric device 300 at the operation level predetermined by the operation level decision process, the electric device 400 may directly receive the operation level from the consumer or user and then be driven as necessary.

In this case, the above-mentioned operation for directly receiving the operation level from the consumer or user may be entered through the power management apparatus 300 or the electric device 400.

As shown in FIG. 2, the electric device 400 includes a second storage unit 410, a second controller 420, a second communication unit 430, a second input unit 440, a second display 450, a second sound unit 460 and a power metering unit 470.

The second storage unit 410 stores device name information, stores maximum instantaneous power for each operation level, average power for each operation level, an operation time indicating a power consumption time, and operation algorithm information, and then stores not only maximum instantaneous power for each function constructing the operation algorithm but also average power consumption for each function.

In addition, the second storage unit 410 stores a maximum instantaneous power corresponding to a standby level, average power, and operation time information indicating a power consumption time. In this case, if it is impossible to establish the operation time, the operation time may be stored as 'NA'.

The maximum instantaneous power, the average power, and the operation time indicating the power consumption time may be provided from a manufacturing company of the electric device, or may be a value measured in real time depending on the execution of the corresponding operation algorithm and be updated.

FIG. 4A exemplarily shows not only power information for each operation level of a washing machine but also operation algorithm information of the washing machine according to the embodiment. FIG. 4B exemplarily shows not only power information for each operation level of an air-conditioner but also operation algorithm information of the air-conditioner according to the embodiment.

In this case, the operation level may be established on the basis of at least one of the average power consumption and the operation time, and the average power consumption and the operation time may be decided according to the operation algorithm.

Referring to FIG. 4A, the washing machine includes three operation levels (L1, L2, L3) and a standby level (L0).

The standby level (L0) indicates a standby state of the washing machine, such that it can be readily recognized that the maximum instantaneous power is 0.019 kW, the average power consumption is 0.019 kW, and the operation time is zero.

The operation levels (L1, L2, L3) of the washing machine have different functions. As the operation level gradually moves from one operation level L1 to another operation level L3, the operation algorithm is more simplified. Accordingly, as the operation level moves from L1 to L3, the maximum instantaneous power and the average power consumption are reduced, and the operation time is also reduced.

In other words, in the case of the washing machine, the operation algorithm functions (e.g., a washing time, a rinsing time, a dehydration time, the number of repetitions, water temperature, motor speed, etc.) are differentially applied to the washing machine according to individual operation levels, such that a difference may occur in power consumption.

Referring to FIG. 4B, the air-conditioner includes a standby level (L0) and four operation levels (L1, L2, L3, L4).

The standby level (L0) indicates a standby state of the air-conditioner, such that it can be readily recognized that the maximum instantaneous power is 0.02 kW, the average power consumption is 0.02 kW, and the operation time is zero.

The operation levels (L1, L2, L3, L4) of the washing machine have differential operation algorithms. As the operation level gradually moves from the first operation level L1 to the fourth operation level L4, the maximum instantaneous power and the average power consumption of the operation algorithm can be reduced.

In other words, in the case of the air-conditioner, the operation algorithm functions (e.g., an indoor-unit filter operation, an outdoor-unit frequency, an indoor-unit super purification (SP) function operation, an indoor-unit driving, etc.) are differentially applied to the air-conditioner, such that a difference may occur in power consumption.

Although the operation level is defined as a combination of a suitable operation and a suitable condition in consideration of product characteristics by the manufacturing company of the electric device, the above-mentioned operation level may be additionally generated by a consumer as necessary.

If a signal for additionally registering the electric device 400 is input to the power management apparatus 300, the second controller 420 extracts a device name, maximum instantaneous power for each operation level, average power consumption, and operation time information from information stored in the second storage unit 410, and transmits the extracted information to the power management apparatus 300.

Upon receiving a driving command message, the second controller 420 controls the device driving using the operation algorithm corresponding to the operation level transmitted from the power management apparatus 300.

Provided that the objective electric device belongs to the third group (G3), if the second controller 420 receives an operation start signal from the consumer, the second controller 420 controls the driving using the operation algorithm corresponding to a command from the consumer. For example, if the electric device contained in the third group G3 is a stove (called a cooktop), the heat intensity corresponding to the driving command of the consumer is adjusted such that food can be cooked at a temperature desired by the consumer.

If the second controller 420 receives an operation level addition signal from the user (or consumer), it controls the driving of the second display 450 so as to display a plurality of functions. In addition, if at least one function selected by the user and an operation algorithm corresponding to the operation time of the at least one function are input to the second controller 420, the second controller 420 additionally generates the operation level corresponding to the operation algorithm entered by the user, generates maximum instantaneous power and average power information in association with the at least one user-selected function or operation time on the basis of information stored in the second storage unit 410, and transmits power information of the additionally generated operation level to the power management unit 300 through the second communication unit 430.

In this case, the maximum instantaneous power and average power information for each function may also be obtained from power information measured at the past driving information of the electric device.

In this case, the second controller 420 extracts the same information (maximum instantaneous power, average power consumption, operation time, etc.) contained in the existing operation level from the second storage unit 410 when the additional operation level is registered by the consumer, and controls the second display 450 to display the above-mentioned information, such that power information of the operation level to be added can be easily recognized.

The second communication unit 430 transmits information of the electric device 400 to the first communication unit 310 of the power management apparatus 300 upon receiving a command from the second controller 420, and transmits operation level information transmitted from the first communication unit 310 of the power management apparatus 300 to the second controller 420.

The second input unit 440 receives a driving indication signal from the user or receives reservation time information from the user, and transmits the received signal to the second controller 420. In addition, the second input unit 440 may also receive an operation level when the driving of the second input unit 440 is indicated.

The second input unit 440 receives an operation level addition signal from the user, and transmits the received signal to the second controller 420. In addition, if the operation level is added, the second input unit 440 receives at least one function from among several functions, and transmits the received function to the second controller 420.

The second display 450 displays an operation level and an operation state when the electric device is driven, and then displays a changed operation level when the power rate level is changed.

The second display 450 displays a plurality of functions when the operation level is added, and displays the same information (e.g., maximum instantaneous power, average power consumption, operation time, etc.) contained in the existing operation level.

The second sound unit 460 outputs a sound signal at the operation start time and the operation end time of the electric device, informs the user of the operation start time and the operation end time of the electric device, and outputs a sound signal when the power rate level is changed so that the user can easily recognize a variation time of the power rate level through the output sound signal.

The power metering unit 470 measures power in real time when the electric device 400 is driven, and transmits the measured power information to the second controller 420, such that it can detect actual power consumed by the electric device 400 and power information for each operation level stored in the second storage unit 410 can be updated.

The power metering unit 470 performs power management not only using a voltage signal detected at both ends of the AC power line connected to a power connector of the electric device 400, but also using a current signal detected at either one of the AC power lines connected to the power connector.

Figure 5:
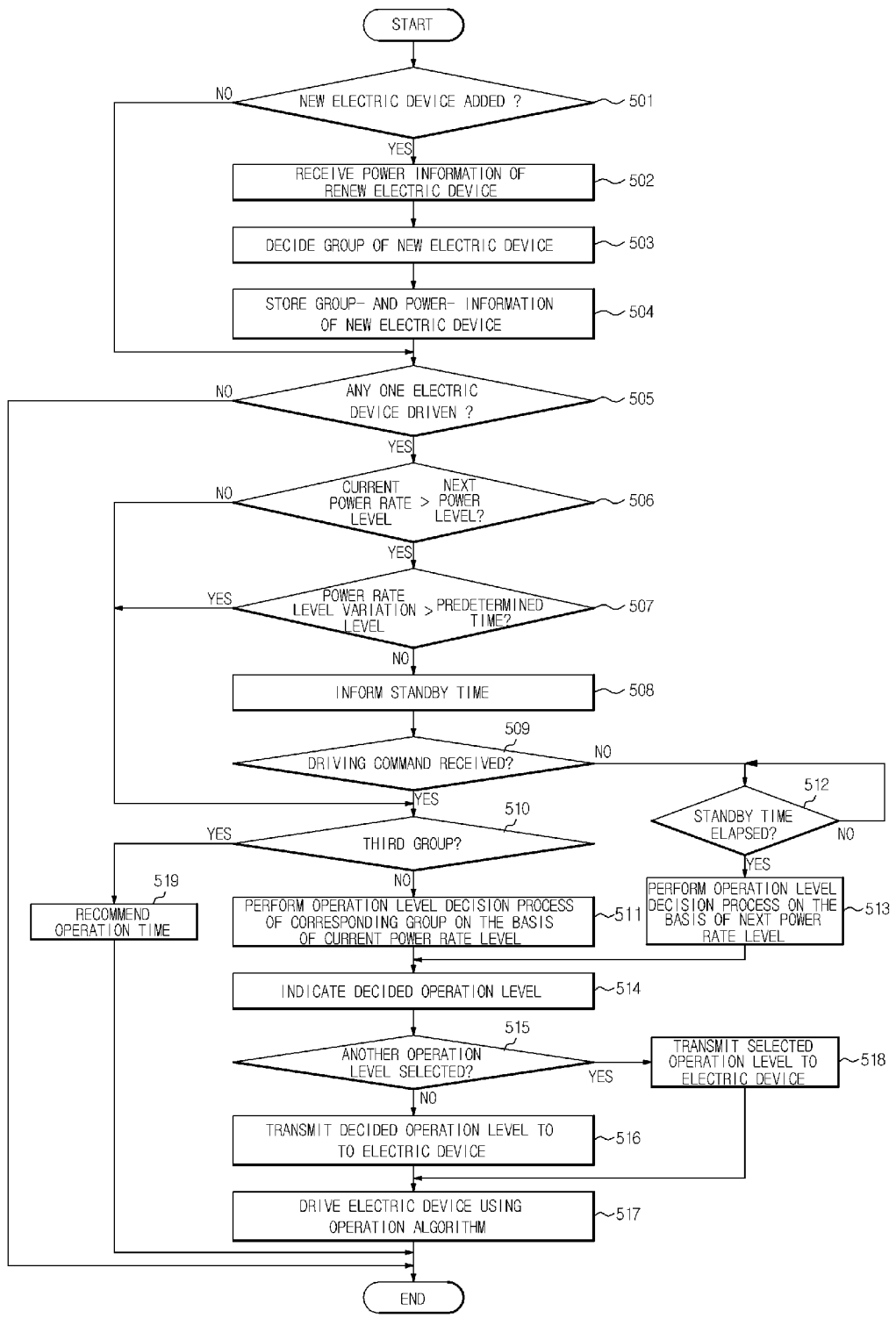
FIG. 5 is a flowchart illustrating a method for controlling a power management system according to one embodiment.

FIG. 5 is a flowchart illustrating a method for controlling a power management system according to one embodiment, and a detailed description of the flowchart shown in FIG. 5 will hereinafter be described with reference to FIGS. 6 to 8.

Figure 6:
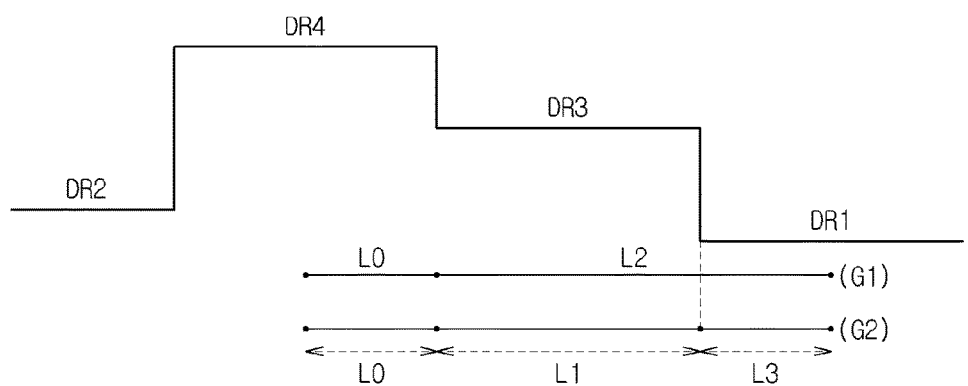
FIG. 6 exemplarily shows a method for deciding an operation level of an electric device belonging to a first or second group contained in a power management system according to one embodiment.
Figure 7A:
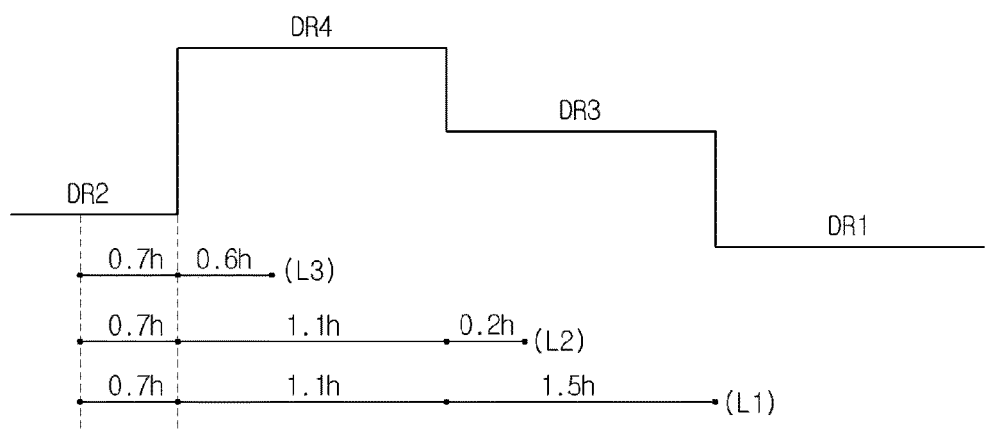
FIGS. 7A and 7B exemplarily show a method for deciding an operation level of an electric device belonging to a first group contained in a power management system according to one embodiment.
Figure 7B:
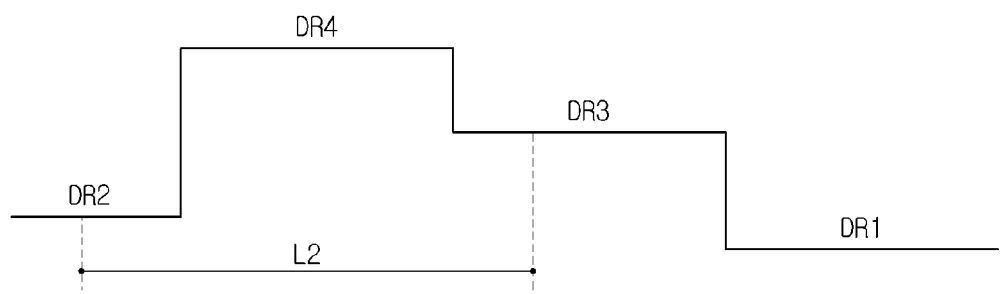
Figure 8A:
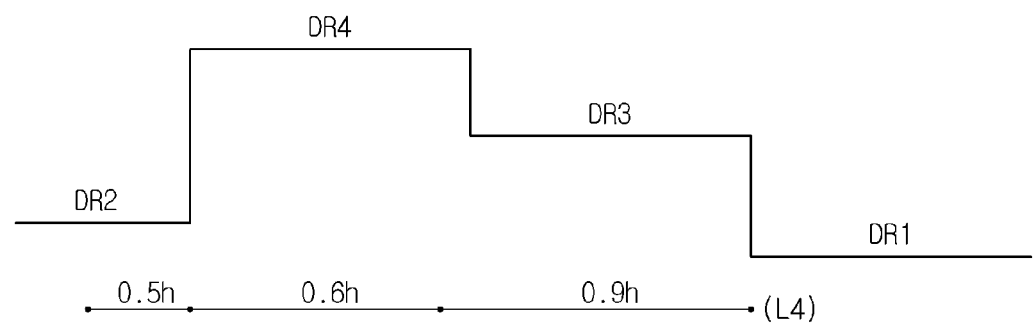
FIGS. 8A to 8C exemplarily show a method for deciding an operation level of an electric device belonging to a second group contained in a power management system according to one embodiment.
Figure 8B:
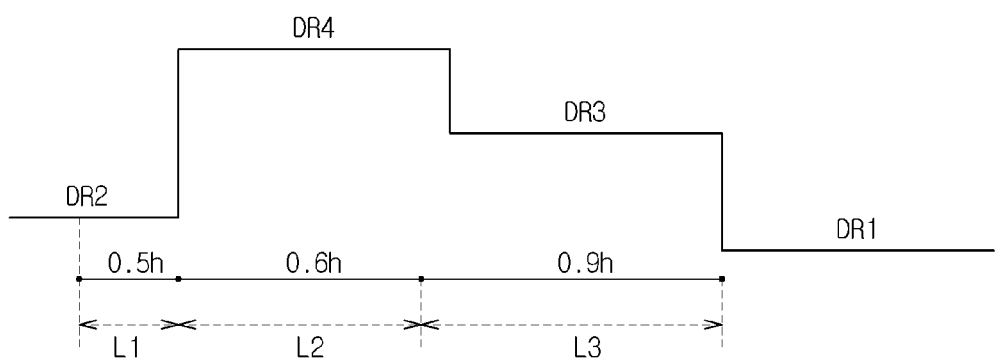

FIG. 6 exemplarily shows a method for deciding an operation level of an electric device belonging to a first or second group including the standby level control. FIGS. 7A and 7B exemplarily show a method for deciding an operation level of an electric device belonging to the first group. FIGS. 8A and 8B exemplarily show a method for deciding an operation level of an electric device belonging to the second group.

If the power management apparatus 300 receives a signal for adding a new electric device 400 according to electric device registration for power control at operation 501, it communicates with the new electric device 400 so as to receive information of the new electric device 400 at operation 502.

In this case, the information of the electric device 400 may include a device name and power information, etc. In the case of the first group G1 or the second group G2, the power information may be maximum instantaneous power for each operation level, average power consumption, information of an operation time during which power is consumed.

It is impossible to establish an operation level of the electric device contained in the third group G3. If the electric device is in the third group G3, power information may be maximum instantaneous power, average power consumption, etc.

The power management apparatus 300 determines a specific group including a new electric device on the basis of power information for each operation level of the electric device 400 (400a, 400b, 400c) at operation 503, and stores not only information of a group including the determined electric device but also power information at operation 504.

In more detail, when determining a group including the new electric device, the power management apparatus 300 determines whether an operation time is established in power information for each operation level. If the operation time is established, the first group G1 is decided. Otherwise, if the operation time is not established, the power management apparatus 300 determines whether the operation level can be established. In this case, if the operation level can be established, the second group G2 is decided. Otherwise, if the operation level is not established, the third group G3 is decided.

The power management apparatus 300 determines whether it receives a driving signal from at least one electric device 400 (400a, 400b, 400c) at operation 505. If the power management apparatus 300 receives the driving signal from the at least one electric device 400 (400a, 400b, 400c), the power management apparatus 300 compares the current power rate level received from the power provider 100 with the next power rate level at operation 506. In this case, if the next power rate level is less than the current power rate level, the power management apparatus 300 determines a time ranging from the current time point to the power rate level variation time, and compares the determined time with a predetermined time at operation 507. If the determined time is shorter than the predetermined time, the power management apparatus 300 informs the user of the standby time as a text message or sound at operation 508.

In this case, the power management apparatus may receive only power rate information from the power provider 100, decide a power rate level on the basis of the received power rate information, and compare the current power rate level with the next power rate level.

In this case, the standby time is consumed from the current time point to the next time point at which the power rate level is changed, such that the standby level can be maintained without executing the function of the electric device.

In this case, the power management apparatus 300 determines whether the user or consumer enters a driving indication signal at operation 509. If the user enters the driving indication signal, the power management apparatus 300 searches for the group list so as to confirm the corresponding electric device group.

The power management apparatus 300 determines whether the electric device is in the third group after recognizing the group of the next electric device at operation 510. If the electric device is not contained in the third group, the power management apparatus 300 performs an operation level decision process of the corresponding group on the basis of the current power rate level at operation 511, such that it determines the operation level and informs the user of the determined operation level using a text message or sound at operation 514.

Under the condition that the remaining time consumed until the power rate level is changed is shorter than the predetermined time, if the user does not enter the driving indication signal, the electric device 400 is maintained at a standby level during the standby time. If the standby time has elapsed at operation 512, the power management apparatus 300 searches for the list of the electric device groups and confirms the group of the corresponding electric device.

After confirming the next electric device group, the power management apparatus 300 determines whether the objective electric device is in the third group. If the electric device is not contained in the third group, the power management apparatus 300 performs the operation level decision process of the corresponding group on the basis of the next power rate level at operation 513, such that the operation level is determined. Then, the power management apparatus 300 informs the user of the determined operation level using a text message or sound at operation 514.

Referring to FIG. 6, if the power rate level moves from the current power rate level DR4 to the next power rate level DR3, the power management apparatus 300 controls each electric device of each group G1 or G2 to stay at the standby level L0 until the power rate level reaches DR3. If the power rate level reaches DR3, the power management apparatus 300 decides the optimum operation level to be the power rate level DR3, and controls each electric device of each group G1 or G2 using an operation algorithm corresponding to the determined operation level.

For example, if the operation level of the electric device of the first group G1 is determined to be L2, the electric device is controlled in the standby level L0. Thereafter, from a specific time at which the power rate level is changed to DR3, the electric device of the first group G1 is driven by the operation algorithm corresponding to L2.

The second group G2 is controlled in the standby level L0 and the operation level for the power rate level DR3 is then determined. In this case, if the operation level is determined to be L2, the electric device of the second group G2 is driven by the operation algorithm corresponding to L1 before the power rate level is changed to DR2. If the power rate level is changed to DR1, the optimum operation level for the power rate level DR1 is re-determined. In this case, if the determined operation level is L3, the electric device is driven using the operation algorithm corresponding to the operation level L3.

The operations 511 and 513 for performing the operation level decision of the corresponding group on the basis of the power rate level will hereinafter be described with reference to FIGS. 7A, 7B, 8A, 8B and 8C.

If the electric device to be driven is in the first group, the power management apparatus 300 calculates the power rates (electricity bills) for each operation level, reflects a discomfort degree for each operation level into the power rate for each operation level, and calculates each level value. Thereafter, the power management apparatus 300 determines an operation level having a minimum level value to be an optimum operation level, and drives the electric device at the determined operation level. A detailed description thereof will hereinafter be described with reference to FIG. 7A.

Referring to FIG. 7A, if the electric device indicating the washing machine is in the first group, the power rate for each operation level can be calculated as follows. In this case, it is assumed that the power rate level DR1 is 20 ₩ /kWh, the power rate level DR2 is 40 ₩ /kWh, the power rate level DR3 is 60 ₩ /kWh, and the power rate level DR4 is 80 ₩ /kWh. In addition, it is assumed that the operation level L1 is set to a discomfort degree '0', the operation level L2 is set to a discomfort degree '10', and the operation level L3 is set to a discomfort degree '20'.

Operation Level L1: 1.13 kW*(40 ₩ /kWh*0.7 h+80 ₩ /kWh*1.1 h+60 ₩ /kWh*1.3 h)= ₩ 219.22

Operation Level L2: 0.14 kW*(40 ₩ /kWh*0.7 h+80 ₩ /kWh*1.1 h+60 ₩ /kWh*0.2 h)= ₩ 17.92

Operation Level L3: 0.11 kW*(40 ₩ /kWh*0.7 h+80 ₩ /kWh*0.6 h)= ₩ 8.36

If the electric device is driven at the operation level L1, the power rates of ₩ 219.22 are expected. If the electric device is driven at the operation level L2, power rates of ₩ 17.92 are expected. If the electric device is driven at the operation level L3, power rates of ₩ 8.36 are expected. If the discomfort degree for each operation level is reflected into the power rate for each operation level, the level value of ₩ 219.22 is calculated at the operation level L1, the level value of ₩ 27.92 is calculated at the operation level L2, and the level value of ₩ 28.36 is calculated at the operation level L3, such that it can be readily recognized that the lowest level is L2.

Therefore, as shown in FIG. 7B, during 2 hours from the current time point, the washing machine acting as the electric device is driven by the operation algorithm corresponding to L2.

If the electric device 400 to be driven is determined to be the air-conditioner and is in the second group, the power management apparatus 300 determines the operation level using the following three operation level decision processes.

The first operation level decision process calculates an average operation time of the electric device 400, assumes that the electric device 400 is driven for the average operation time, and calculates the power rate for each operation level. In addition, the first operation level decision process calculates the power rate for each operation level, reflects a discomfort degree for each operation level in the power rate for each operation level, calculates each level value, and determines a specific level having a minimum level value to be an operation level.

Referring to FIG. 8A, if the electric device to be driven is an air-conditioner contained in the second group, the power rates of individual operation levels can be calculated as follows. In this case, it is assumed that the power rate level DR1 is 20 ₩ /kWh, the power rate level DR2 is 40 ₩ /kWh, the power rate level DR3 is 60 ₩ /kWh, and the power rate level DR4 is 80 ₩ /kWh. In addition, it is assumed that the operation level L1 is set to a discomfort degree '0', the operation level L2 is set to a discomfort degree '10', the operation level L3 is set to a discomfort degree '20', the operation level L4 is set to a discomfort degree '30', and the average operation time is set to 2 hours.

Operation Level L1: 3.23 kW*(40 ₩ /kWh*0.5 h+80 ₩ /kWh*0.6 h+60 ₩ /kWh*0.9 h)= ₩ 394.06

Operation Level L2: 2.86 kW*(40 ₩ /kWh*0.5 h+80 ₩ /kWh*0.6 h+60 ₩ /kWh*0.9 h)= ₩ 348.92

Operation Level L3: 2.23 kW*(40 ₩ /kWh*0.5 h+80 ₩ /kWh*0.6 h+60 ₩ /kWh*0.9 h)= ₩ 272.06

Operation Level L4: 1.21 kW*(40 ₩ /kWh*0.5 h+80 ₩ /kWh*0.6 h+60 ₩ /kWh*0.9 h)= ₩ 147.62

If the discomfort degree for each operation level is reflected in the power rate for each operation level, the level value of ₩ 394.06 is calculated at the operation level L1, the level value of ₩ 358.92 is calculated at the operation level L2, the level value of ₩ 297.06 is calculated at the operation level L3, and the level value of ₩ 177.62 is calculated at the operation level L4, such that it can be readily recognized that the smallest level is L4.

Accordingly, the air-conditioner serving as the electric device is driven by the operation algorithm corresponding to the operation level L4 in the range from the current time point.

The second operation level decision process calculates the average operation time of the electric device 400, combines individual operation levels on the basis of the number of power rate level variations encountered in the average operation time, calculates the power rate for each combination on the basis of each power rate level, reflects a discomfort degree for each operation level so as to calculate each level value, and decides a specific level having a minimum level value to be an operation level. In other words, provided that N operation levels are established, if the power rate level is changed three times, $N^3$ combinations are generated.

Referring to FIG. 8B, if the electric device to be driven is an air-conditioner contained in the second group, the power rates of individual operation levels can be calculated as follows. In this case, it is assumed that the power rate level DR1 is 20 ₩/kWh, the power rate level DR2 is 40 ₩/kWh, the power rate level DR3 is 60 ₩/kWh, and the power rate level DR4 is 80 ₩/kWh. In addition, it is assumed that the air-conditioner includes three operation levels, operation level L1 is set to a discomfort degree '0', operation level L2 is set to a discomfort degree '10', operation level L3 is set to a discomfort degree '20', and the average operation time is set to 2 hours.

27 combinations (i.e., L1+L1+L1, L1+L1+L2, L1+L1+L3, L1+L2+L1, L1+L3+L1, . . . , L3+L3+L3, etc.) are generated for individual operation levels, the power rate generated for 2 hours of each combination is calculated, a discomfort degree is reflected in each operation level so as to calculate a level value, and an operation level having a minimum level value is determined to be an optimum operation level.

Referring to FIG. 8B, in the range from the current time point to the next time point at which the initial power rate level begins to be changed, the air-conditioner acting as the electric device is driven at the operation level L1. Then, the air-conditioner serving as the electric device is driven at the operation level L3 before the next power rate level is changed. After that, the air-conditioner acting as the electric device is driven at the operation level L3 before the next power rate level begins to be changed.

In addition, if a signal for stopping the operation of the electric device is entered by the consumer while the electric device is driven, the electric device stops operation.

Figure 8C:
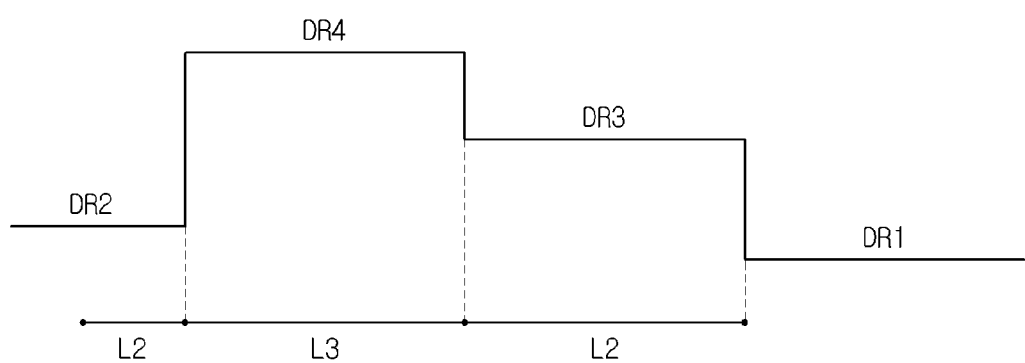

As shown in FIG. 8C, the third operation level decision process calculates the power rate level for each operation level in the range from an operation start time of the electric device to a specific time where the power rate level is changed to another. The third operation level decision process reflects a discomfort degree for each operation level into the power rate for each operation level so as to calculate each level value. In addition, a specific level having a minimum level value is determined to be an operation level, so that the third operation level decision process controls the driving of the electric device 400 at an operation level decided at the operation start time of the electric device. The third operation level decision process re-decides an operation level whenever the power rate level is changed, indicates the re-decision of the operation level by controlling the first display 340 and the first sound unit 350, and controls the driving of the electric device 400 at the re-decided operation level in the range from a power rate level change start time.

In this case, it is possible to change a current level to another level according to the power rate level variation.

Thereafter, it is determined whether another operation level is selected by the consumer at operation 515. If the consumer does not select another operation level, information about the determined operation level is transmitted to the electric device at operation 516, and the electric device is driven by the operation algorithm corresponding to the transmitted operation level at operation 517.

On the other hand, if another operation level is selected by the consumer, information about the selected operation level is transmitted to the electric device at operation 518, and the electric device is driven by the operation algorithm corresponding to the transmitted operation level at operation 517.

In the case of determining the electric device group, if the electric device is in the third group, an operation time having a minimum power rate is determined on the basis of the maximum instantaneous power and the average power consumption of the corresponding electric device, and the determined operation time is recommended at operation 519. In other words, the power management apparatus informs the user or consumer of the recommended operation time using a text message or sound signal.

If the operation level for driving the electric device exceeds either a predetermined allowed instantaneous power or a monthly predetermined power rate, the power management apparatus controls the electric device to remain at the standby level L0.

In addition, the electric device 400 is controlled in the standby level, and each of a power rate level variation time, a changed power rate level, and an operation level for the changed power rate level is indicated as a text message or sound.

If several electric devices 400 are present and the driving operations of the electric devices 400 (400a, 400b, 400c) are simultaneously indicated, the power management apparatus 300 determines the operation levels of several electric devices 400 (400a, 400b, 400c) according to priorities.

The power management apparatus 300 sums the maximum instantaneous power amounts of several electric devices to be driven so as to predict instantaneous power, and compares the predicted instantaneous power with the allowed instantaneous power. If the predicted instantaneous power exceeds the allowed instantaneous power, electric devices sequentially enter the standby level in ascending numerical order of priorities assigned to several electric devices.

If the predicted instantaneous power is lower than the allowed instantaneous power, the power management apparatus 300 drives the electric devices using the operation algorithm corresponding to the determined operation level of the electric devices of each group G1 or G2 controlled at the standby level.

In addition, if the current electricity bill is close to or higher than the monthly predetermined electricity bill, the power management apparatus 300 may inform the user of this situation using a text message or sound.

In this way, the power management apparatus simultaneously considers not only electricity bill variation caused by operation level variation but also user inconvenience (i.e., a degree of discomfort) caused by the variation of electricity bill, such that it can determine an optimum operation level.

In other words, differential operation algorithms of individual operation levels are appropriately controlled according to power rate levels, such that the electric device 400 can be effectively driven and power consumption can be reduced.

Figure 9:
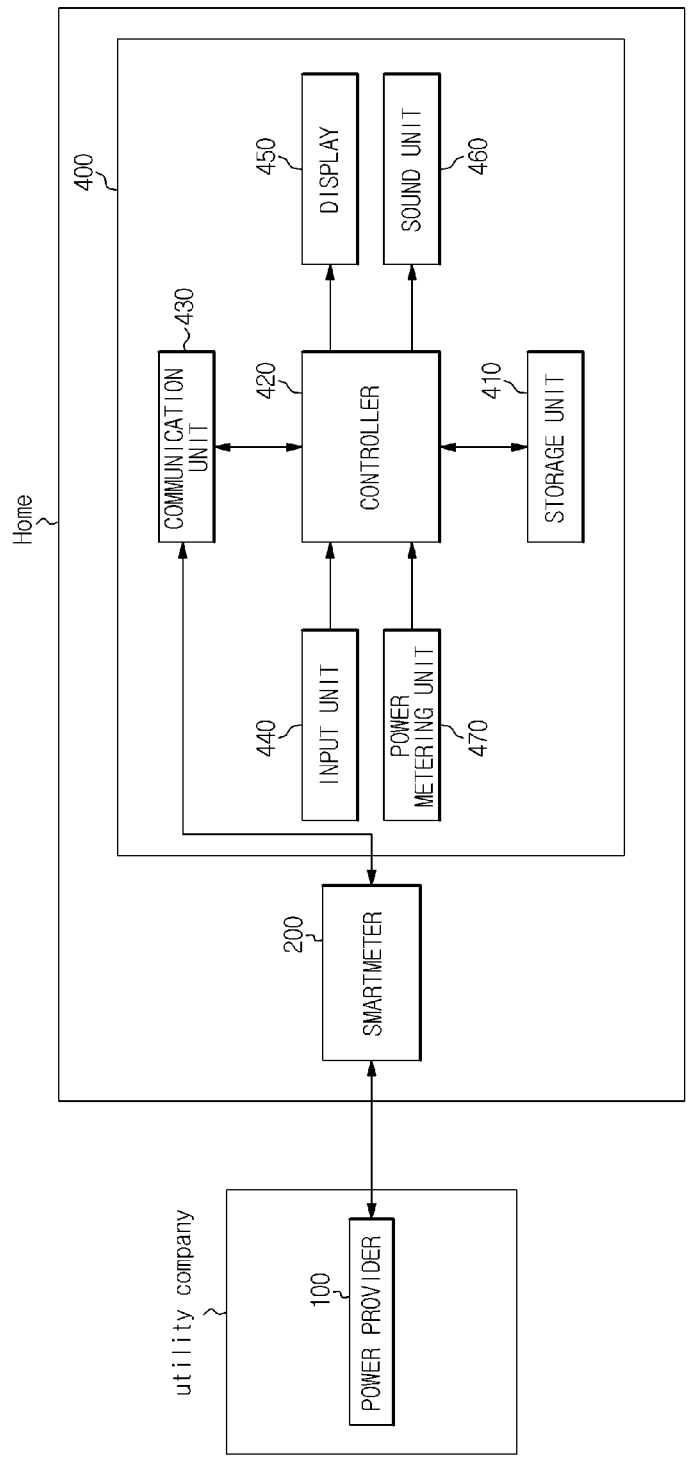
FIG. 9 is a block diagram illustrating an electric device according to another embodiment.

FIG. 9 is a block diagram illustrating an electric device according to another embodiment. Referring to FIG. 9, the electric device according to the other embodiment of the present invention includes a storage unit 410, a controller 420, a communication unit 430, an input unit 440, a display 450, a sound unit 460, and a power metering unit 470.

The electric device 400 communicates with the smartmeter 200. The smartmeter 200 communicates with the power provider 100. In this case, communication may be any of wired communication, wireless communication, wired/wireless hybrid communication, etc.

The power provider 100 is used as a power supply source that is driven by a power supply company (utility company) which generates and supplies power. The power provider 100 generates the power through atomic energy, hydraulic power, geothermal power, wind power, etc., and provides the generated power to the electric device 400 installed in each home.

That is, the power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary, and the established power rate level may also be sent to the smartmeter 200.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the electric device 400.

The smartmeter 200 receives power rate information from the power provider 100, and displays the received power rate information such that the user can view the displayed information.

The electric device 400 is driven on the basis of its own power information and the power rate level of the power provider 100.

In this case, the number of the power rate levels may be 4 (DR1 to DR4), and a plurality of levels may have different power rates and different allowed instantaneous powers. Let us assume that the number of power rate levels is 4 (DR1 to DR4). In more detail, the power rate level DR1 is the lowest power rate level, and the power rate level DR4 is the highest power rate level. Power rate level is proportional to power rate.

The storage unit 410 stores maximum instantaneous power for each operation level, average power for each operation level, an operation time indicating a power consumption time, and operation algorithm information, and then stores not only maximum instantaneous power for each function constructing the operation algorithm but also average power consumption for each function. In addition, the storage unit 410 stores maximum instantaneous power corresponding to a standby level, average power, and operation time information indicating a power consumption time.

In this case, if it is impossible to establish the operation time, the operation time may be stored as 'NA'.

The maximum instantaneous power, the average power, and the operation time indicating the power consumption time may be provided from the manufacturing company of the electric device, or may be a value measured in real time depending on the execution of the corresponding operation algorithm and be updated.

The storage unit 410 stores a discomfort degree for each operation level and information on the user or consumer. In this case, the user information may include the monthly predetermined power rate, the allowed instantaneous power information, and the user's personal information.

The controller 420 performs the operation level decision process on the basis of the power rate level and then decides the operation level. In this case, the operation level decision process may be changed according to whether the operation time or the operation level is established.

Provided that the operation time is established, a detailed description of the operation time is as follows.

The controller 420 reflects a power rate level, average power consumption for each operation level, an operation time for each operation level, and a discomfort degree for each operation level so as to determine an operation level according to the reflected result. After that, the controller 420 controls the driving of the electric device until reaching the operation end time point at the operation level decided at the operation start time point.

The controller 420 determines whether the power rate level is changed within a predetermined time before the operation level is decided. Provided that the power rate level is changed, if the power rate level to be changed is lower than the current power rate level, the controller 420 determines a standby time consumed until the power rate level is changed, controls the display 450 and the sound unit 460, and informs the user of the standby time.

If the operation time is not established or is set to 'NA', and if the operation level is also established, the operation level is determined by any one of three operation level decision processes.

The first operation level decision process calculates the average operation time, and reflects the calculated average operation time, average power consumption, and a discomfort degree for each operation level, such that it determines an operation level according to the calculated result.

The second operation level decision process calculates an average operation time, reflects the calculated average operation time, the number of power rate level variations encountered during the average operation time, an operation level combination corresponding to the number of power rate level variations, predicted electricity bill for each operation level combination, average power consumption for each combination, and a discomfort degree for each operation level, so that it can determine the operation level according to the reflected result.

The third operation level decision process reflects an operation time from an operation start time to a power rate level variation time, a power rate level, and a discomfort degree for each operation level, such that it determines the operation level according to the reflected result. The third operation level decision process re-decides the operation level at a specific time where the power rate level is changed, indicates the re-decision of the operation level by controlling the display 450 and the sound unit 460, and controls the driving of the electric device 400 at the re-decided operation level in the range from a power rate level change start time.

If the determined operation level of the electric device exceeds either a predetermined allowed instantaneous power or a monthly predetermined power rate, the power management apparatus controls the electric device to stay in the standby level L0.

In addition, when the electric device 400 is controlled in the standby level, the controller 420 controls the display 450 and the sound unit 460 such that it informs the user of a power rate level variation time point, a changed power rate level, and an operation level related to the changed power rate level.

If the operation time is not established or is set to 'NA', or if the operation level is not established, the controller 420 determines a specific time where a minimum power rate is assigned to each power rate level, and indicates the determined time as a recommended operation time by controlling the display 450 and the sound unit 460. If the user enters the operation start signal, the controller 420 controls the driving of the electric device using the operation algorithm corresponding to the user command.

If the controller 420 receives an operation level addition signal from the user, it controls the driving of the display 450 so as to display a plurality of functions. In addition, if at least one function selected by the user and an operation algorithm corresponding to the operation time of the at least one function are input to the controller 420, the controller 420 additionally generates the operation level corresponding to the operation algorithm entered by the user, and stores the generated level in the storage unit 410.

In this case, the maximum instantaneous power and average power information for each function constructing the operation algorithm may also be obtained from power information measured at the past driving information of the electric device.

In this case, the controller 420 extracts the same information (maximum instantaneous power, average power consumption, operation time, etc.) contained in the existing operation level from the second storage unit 410 when the additional operation level is registered by the user, such that power information of the operation level to be added can be easily recognized.

The communication unit 430 communicates with the smartmeter 200, receives a power rate and the power rate level corresponding to the power rate from the smartmeter 200, and transmits the received information to the controller 420, and the power measured by the power metering unit 470 to the smartmeter 200.

If the user selects the operation level, the input unit 440 transmits the selected operation level to the controller 420, receives the driving indication signal and the driving reservation time information, and transmits the received information to the controller 420.

The input unit 440 may be integrated with the display 340, thereby forming a touchscreen.

The input unit 440 receives an operation level addition signal from the user, and transmits the received signal to the controller 420. In addition, if the operation level is added, the second input unit 440 receives at least one function from among several functions constructing the operation algorithm, and transmits the received function to the controller 420.

The display 450 displays an operation level and the power rate value when the electric device is driven at the operation level, and then displays an operation state when the electric device is driven.

In addition, the display 450 may also display the operation time for each operation level and the power rate for each operation level as necessary.

If the power rate level is changed, the display 450 displays the changed power rate level as a text message, and also displays a time consumed until the power rate level is changed as a text message.

If the operation level of the electric device is changed by the user, the display 450 displays the changed operation level and the power rate value corresponding to the displayed operation level.

If the operation time and the operation level are not established, the display 450 displays a recommended operation time of the corresponding electric device capable of obtaining the effective power saving.

If the operation level is added, the display 450 displays a plurality of functions, and displays the same information (maximum instantaneous power, average power consumption, operation time, etc.) contained in the existing operation level.

The sound unit 460 audibly outputs the determined operation level and its associated power rate value, audibly outputs the next power rate level, and also audibly outputs a time consumed until the current power rate level is changed to another power rate level. If the operation level is changed to another by the user, the sound unit 460 audibly outputs the changed operation level and associated power rate value such that the user can easily recognize the output information.

The sound unit 460 outputs a sound signal at the operation start time point and the operation end time point, such that it informs the user of the operation start time point and the operation end time point.

The power metering unit 470 measures power of the driven electric device in real time, transmits information of the measured power to the controller 420, such that it can detect the actual amount of power consumed by the electric device 400 and at the same time can update power information for each operation level stored in the storage unit 410.

The power metering unit 470 performs power management not only using a voltage signal detected at both ends of the AC power line connected to a power connector of the electric device 400, but also using a current signal detected at either one of the AC power lines connected to the power connector.

As described above, the power metering unit classifies several different operation levels in order for the user to select the power consumption or the operation time, such that it can decide the operation level suitable for the variation in the power rate level.

Figure 10:
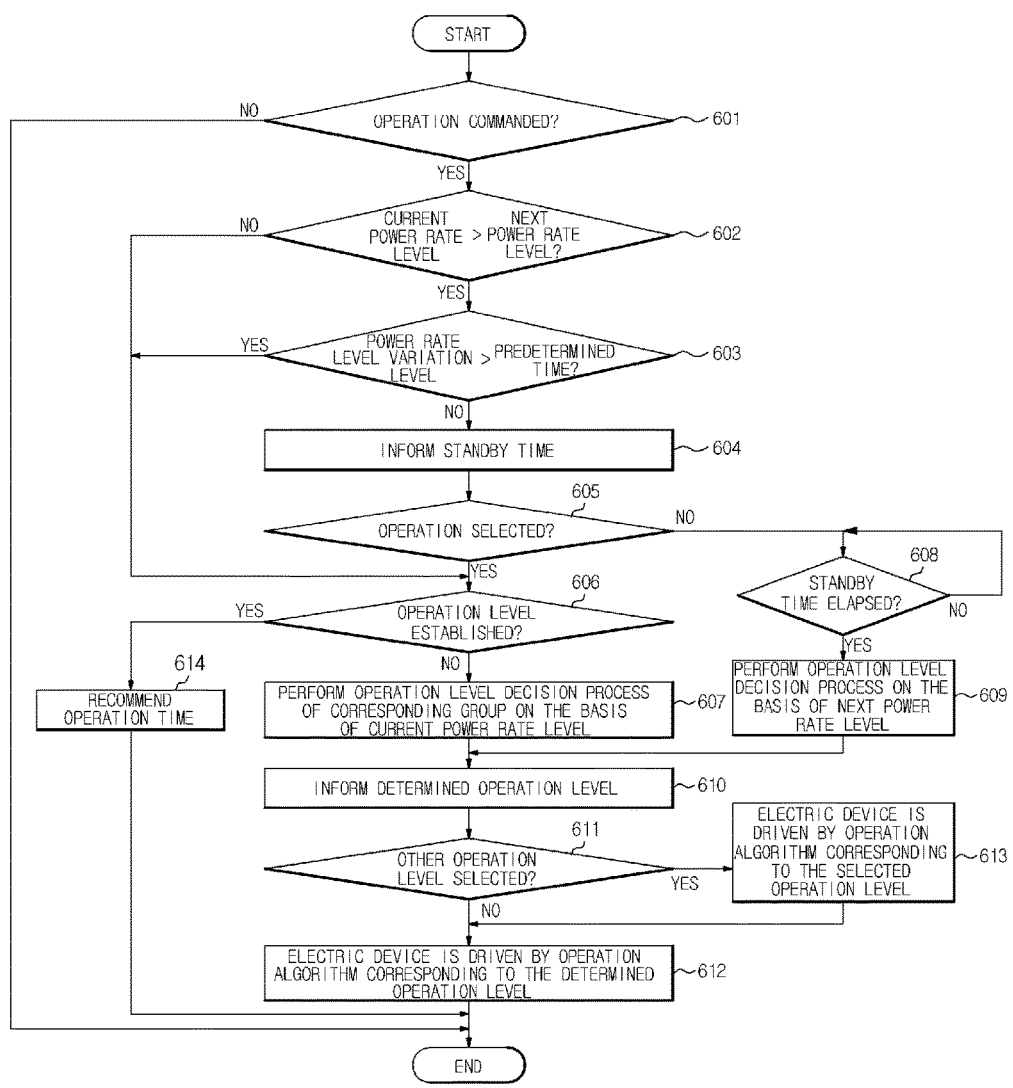
FIG. 10 is a flowchart illustrating a method for controlling an electric device according to another embodiment.

FIG. 10 is a flowchart illustrating a method for controlling an electric device according to another embodiment. A detailed description of the method for controlling the electric device will hereinafter be described with reference to FIGS. 9 and 10.

The electric device 400 determines the input of the operation indication signal or the reserved time at operation 601, such that it determines the operation start time according to the determined result.

If it is necessary for the electric device 400 to start operation, the electric device 400 compares the current power rate level received from the smartmeter 200 with the next power rate level at operation 602. If the next power rate level is lower than the current power rate level, the electric device determines a time consumed from the current time point to the next time point where the power rate level is changed, and compares the determined time with a predetermined time at operation 603. If the determined time is shorter than the predetermined time, the standby time is indicated as a text message or sound at operation 604.

In this case, the standby time is consumed from the current time point to the next time point at which the power rate level is changed, such that the standby level can be maintained without operating the electric device.

The electric device 400 determines whether the operation selection signal is entered by the user at operation 605. If the driving selection signal is entered by the user, the electric device 400 confirms whether the operation level is established at operation 606. If the operation level is established, it is confirmed whether the operation time of the electric device 400 is established, such that the operation level decision process is carried out on the basis of the current power rate level according to the confirmed result at operation 607.

Under the condition that the remaining time consumed until the power rate level is changed is shorter than the predetermined time, if the user does not enter the operation selection signal, the electric device 400 is maintained at a standby level during the standby time. If the standby time has elapsed at operation 608, the operation level decision process is carried out on the basis of the next power rate level at operation 609.

A method for performing the operation level decision process on the basis of the next power rate level will hereinafter be described with reference to the annexed drawings.

A detailed description of the operation level decision process when the operation time is established will hereinafter be described.

The electric device 400 calculates the power rate for each operation level on the basis of the power rate level, reflects a discomfort degree for each operation level in the power rate for each operation level so as to calculate each level value. The first operation level decision process decides a specific level having a minimum level value to be an operation level, and informs the user of the decided operation level at operation 610.

If the operation time is not established or is set to 'NA', and if the operation level is established, the operation level is determined by any one of three operation level decision processes.

The first operation level decision process calculates the average operation time of the electric device, assumes that the electric device is operated during the average operation time, calculates the power rate for each operation level, reflects a discomfort degree for each operation level in the power rate for each operation level so as to calculate each level value. The first operation level decision process decides a specific level having a minimum level value to be an operation level, and informs the user of the decided operation level at operation 610.

The second operation level decision process calculates an average operation time of the electric device 400, combines individual operation levels on the basis of the number of power rate level variations encountered in the average operation time, calculates the power rate for each combination on the basis of each power rate level, reflects a discomfort degree for each operation level so as to calculate each level value, decides a specific level having a minimum level value to be an operation level, and informs the user of the decided operation level at operation 610.

The third operation level decision process calculates the power rate value for each operation level in the range from an operation start time to a specific time where the power rate level is changed. The third operation level decision process reflects a discomfort degree for each operation level into the power rate for each operation level so as to calculate each level value, decides a specific level having a minimum level value to be an operation level, and informs the user of the decided operation level at operation 610.

In this case, the third operation level decision process re-decides an operation level whenever the power rate level is changed, indicates the re-decided operation level by controlling the display 450 and the sound unit 460, such that the user can recognize the re-decided operation level.

The electric device determines whether the user selects another operation level at operation 611. If the user does not select another operation level, the electric device is driven by the operation algorithm corresponding to the determined operation level at operation 612.

On the other hand, if the user selects another operation level, the electric device 400 is driven by the operation algorithm corresponding to the selected operation level at operation 613.

If the operation level and the operation time are not established, the electric device 400 decides the operation time having a minimum power rate on the basis of the maximum instantaneous power and the average power consumption, recommends the decided operation time, and informs the user of the recommended operation time using a text message or sound.

In the case of establish/deciding the operation level, if the operation level is not established, the power rate for each power rate level is calculated, and the electric device decides a specific time having a minimum power rate to be an optimum operation time and recommends the determined time to the user at operation 614.

If the operation level exceeds either a predetermined allowed instantaneous power or a monthly predetermined power rate, the electric device is controlled in the standby level L0 and is maintained in the standby state.

In addition, the electric device 400 is controlled in the standby level, and each of a power rate level variation time, a changed power rate level, and an operation level for the changed power rate level is indicated as a text message or sound.

In this way, the electric device simultaneously considers not only electricity bill variation caused by an operation level variation but also user inconvenience (i.e., a discomfort degree) caused by the variation of electricity bill, such that it can determine an optimum operation level.

In other words, differential operation algorithms of individual operation levels are appropriately controlled according to power rate levels, such that the electric device 400 can be effectively driven and power consumption can be reduced.

As is apparent from the above description, the electric device, the power management apparatus including the same, and a method for controlling the power management apparatus according to the present invention perform different operation algorithms according to power rate information, and control power consumption of the electric device, such that energy efficiency at the user side can be maximized, resulting in reduction in electricity bills.

In addition, under the restrictions (e.g., the allowed instantaneous power, the monthly predetermined power rate, the threshold power, etc.), the driving control of several electric devices can be optimized.

In response to the changed power rate information, the currently-driven electric device and the electric device to be driven can be driven at the optimum operation level appropriate for their power consumption characteristics.

In addition, the user can additionally establish the operation algorithm, resulting in an increase in user satisfaction.

In addition, the power management apparatus can drive a plurality of electric devices according to priorities established by the user, resulting in an increase in user satisfaction.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A power manager comprising:
  a communication unit configured to receive power rate information from a power supplier; and
  a controller configured to determine an operation level of an electric device based on the power rate information and power information for each operation level of the electric device and control an operation of the electric device at the determined operation level,
  wherein the power information includes an operation time during which power is consumed, the controller determines a group of the electric device based on the operation time of the electric device and determines the operation level based on the group of the electric device, and the group includes a first group in which the operation time is allowed to be set, a second group in which the operation time is not allowed to be set, and a third group in which the operation time and the operation level are not allowed to be set.

2. The power manager of claim 1, wherein the power information includes maximum power consumption and average power consumption.

3. The power manager of claim 2, wherein the controller reflects a power rate for each operation level and a degree of discomfort for each operation level upon determining the operation level.

4. The power manager of claim 3, wherein, when the electric device is in the first group, the controller determines the operation level in consideration of the power rate information, average power consumption for each operation level, an operation time for each operation level, and the degree of discomfort for each operation level.

5. The power manager of claim 4, wherein, when the electric device is in the first group, the controller controls the electric device at an operation level determined at an operation start time of the electric device until an operation end time is reached.

6. The power manager of claim 4, wherein, when the electric device is in the first group, the controller confirms a variation in power rate information within a predetermined time, and when the power rate is changed to a low level, the controller informs a user of a standby time consumed until the power rate information is changed.

7. The power manager of claim 3, wherein, when the electric device is in the second group, the controller calculates an average operation time of the electric device and determines the operation level in consideration of the calculated average operation time, the average power consumption, the power rate information, and the degree of discomfort for each operation level.

8. The power manager of claim 3, wherein, when the electric device is in the second group, the controller calculates an average operation time of the electric device and determines the operation level in consideration of the calculated average operation time, the number of variations in power rate information within the average operation time, the average power consumption, and the degree of discomfort for each operation level.

9. The power manager of claim 3, wherein, when the electric device is in the second group, the controller determines the operation level in consideration of an operation time from an operation start time of the electric device to a time at which the power rate information is changed, the power rate information, and the degree of discomfort for each operation level.

10. The power manager of claim 3, wherein, when the electric device is in the second group, the controller controls the electric device at an operation level determined at an operation start time of the electric device and redetermines the operation level at a time at which the power rate information is changed.

11. The power manager of claim 10, further comprising:
a display configured to display the redetermined operation level; and
a sound unit configured to audibly output the redetermined operation level.

12. The power manager of claim 11, wherein the operation level includes a standby level in which the power information is set when the electric device stays in a standby state.

13. The power manager of claim 12, wherein, when the determined operation level exceeds predetermined allowed instantaneous power or a predetermined monthly power rate, the controller performs control at the standby level.

14. The power manager of claim 12, wherein the display displays at least one of the determined operation level, an operation time for each operation level, and the power rate for each operation level.

15. The power manager of claim 12, wherein the sound unit audibly outputs at least one of the determined operation level, an operation time for each operation level, and the power rate for each operation level.

16. The power manager of claim 3, wherein, when the electric device is in the third group, the controller informs a user of a time having a minimum power rate for each piece of the power rate information.

17. The power manager of claim 1, wherein, when the electric device is provided in plurality and the plurality of electric devices are simultaneously driven, the controller determines an operation level according to priorities of the plurality of electric devices.

18. An electric device including information regarding a plurality of operation algorithms and power information for each operation level corresponding to the information regarding the plurality of operation algorithms, the electric device comprising:
a communication unit configured to receive power rate information from a power supplier;
a storage unit configured to store the information regarding the plurality of operation algorithms, the operation algorithms being based on at least one of maximum power consumption, average power consumption and an operation time during which power is consumed; and
a controller configured to determine an operation level of the electric device based on the power rate information, the operation algorithm for each operation level of the electric device and a group to which the electric device belongs based on whether the operation time, the operation level, or combination of the operation time and the operation level are allowed to be set, and to control an operation of the electric device using a determined operation algorithm corresponding to the determined operation level,
wherein the group includes a first group in which the operation time is allowed to be set, a second group in which the operation time is not allowed to be set, and a third group in which the operation time and the operation level are not allowed to be set.

19. The electric device of claim 18, wherein the operation level includes a standby level in which the power information is set when the electric device stays in a standby state.

20. The electric device of claim 18, further comprising:
a display configured to display at least one of the determined operation level, an operation time for each operation level, and a power rate for each operation level; and
a sound unit configured to audibly output at least one of the determined operation level, the operation time for each operation level, and an expected power rate for each operation level.

21. The electric device of claim 18, further comprising an input unit configured to receive the operation level from a user and further receive a setting for adding the operation level.

22. The electric device of claim 21, wherein the input unit receives a signal for adding the operation level from the user and additionally receives a function constituting the operation algorithm.

23. The electric device of claim 22, wherein the controller additionally sets the operation level corresponding to the additionally received function, and transmits power information having the additionally set operation level to a power manger.

24. The electric device of claim 18, wherein the controller further has a function of reflecting a degree of discomfort upon determining the operation level.

* * * * *